United States Patent [19]

Elefritz, Jr.

[11] 4,267,311
[45] May 12, 1981

[54] NOVEL METHOD FOR REMOVAL OF SODIUM CHLORIDE FROM PHOSPHAZENE RUBBER CRUMB SWOLLEN IN WATER

[75] Inventor: Robert A. Elefritz, Jr., Akron, Ohio

[73] Assignee: The Firestone Tire & Rubber Company, Akron, Ohio

[21] Appl. No.: 770,888

[22] Filed: Feb. 22, 1977

[51] Int. Cl.³ .......................... C08G 73/00; C08J 3/00
[52] U.S. Cl. .................................. 528/499; 528/399; 528/500; 528/168
[58] Field of Search ................. 260/2 P; 528/500, 499

[56] References Cited

U.S. PATENT DOCUMENTS 2,766,224  10/1956  Bannon ................................. 528/500
3,853,794  12/1974  Reynard et al. ...................... 260/2 P Primary Examiner—Wilbert J. Briggs, Sr.

[57] ABSTRACT

A procedure is disclosed for the removal of alkali metal halide from phosphazene rubber crumb swollen in water. The crumb is pressed whereby a large proportion of the alkali halide is discharged from the crumb.

5 Claims, No Drawings

NOVEL METHOD FOR REMOVAL OF SODIUM CHLORIDE FROM PHOSPHAZENE RUBBER CRUMB SWOLLEN IN WATER

Process for the removal of alkali metal halide from phosphazene crumb rubber.

This invention relates to the purification of the phosphazene rubber which is produced when the halogen atoms in a polydihalophosphazene is reacted with an alkoxide or aryloxide, e.g. as described in Allcock et al. U.S. Pat. No. 3,370,020 issued Feb. 20, 1968 or Rose U.S. Pat. No. 3,515,688 issued June 2, 1970, or elsewhere in the literature.

In general terms the reaction whereby the polydihalophosphazene is converted to a variety of useful products may be represented as follows:

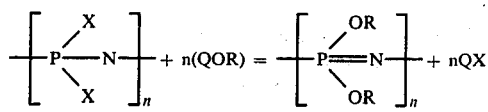

wherein X is a halogen, usually Cl, Br or I; Q is an alkali metal, usually Na, R is an alkyl or aryl group which may be substituted, and n is an integer greater than 3.

As described in the above noted patents, the reaction is usually conducted in an organic solvent such as toluene, benzene, or other solvent* and the resulting reaction product is a phosphazene rubber, swollen with an organic solvent and containing 25% by weight of more of alkali metal halide which must be removed.

*or mixture of solvents

According to the present invention, removal of the alkali metal halide is accomplished by a two step process, the first step of which comprises treating the reaction product with steam in the presence of some additional water, whereby a product consisting of phosphazene rubber crumb contaminated with salt water is obtained.

In this step water is charged to a large steel vessel, which is equipped for high speed/high shear agitation and has an exhaust vapor take off port. The water is mixed and heated by direct steam injection or other means to a temperature sufficient to vaporize the organic solvent. The phosphazene rubber, dissolved in the organic solvent, is then fed slowly into the vessel with continuous agitation. An approximate ratio of 10 pounds of water per pound of rubber (dry weight) is suitable. The preferred operating temperature is a temperature just above the normal boiling point of the organic solvent which is to be removed by vaporization. Treatment time depends on the batch size.

Heating by direct steam injection vaporizes the solvent which is taken off through the vapor take off port, while the rubber precipitates from the solution. The rubber coagulates in crumblike particles in the water phase while the vaporized solvent is removed overhead for eventual recovery and reuse. As the steam heating continues, the rubber swells and appears to take up hot water which readily dissolves salt present in the mixture. At the end of the coagulation step, the entire water-rubber slurry is dropped from the vessel onto a screen. The bulk of the water drains away from the solid rubber particles which are called "crumb". However the "crumb" rubber is rather spongelike and some residual water, containing dissolved metal halide, is trapped by the crumb and is known as "swelling" water.

The principal object of the present invention is to remove the "swelled" water and the dissolved salt impurity from the phosphazene rubber crumb. Because the salt is soluble in the water rather than in the phosphazene rubber particles, separation of the water from the phosphazene rubber also rids the rubber of the alkali metal halide salt.

The invention will be further understood from the following example which is intended to illustrate a preferred embodiment of the invention and is not intended to limit the invention in any way.

Following the procedures described in Rose U.S. Pat. No. 3,515,688, a polydichlorophosphazene was prepared as in Example 1 of the patent and was then derivatized by reaction in an organic solvent with a mixture of sodium trifluoroethoxide (NaOCH$_2$CF$_3$) and sodium (NaOCH$_2$(CF$_2$)$_n$(CF$_3$)) (n=3,5,7).

The resulting mixture of phosphazene rubber and sodium chloride in organic solvent was subjected to steam coagulation as described above, after which the product was divided into two halves. The first half was washed with a mixture of water and steam (hot water) which caused the salt (NaCl) content to be decreased from about 25% to 3%. The wet crumb was squeezed manually to remove as much water as possible. The resulting crumb contained only 0.5 weight percent NaCl.

The second part was milled on a six inch mill for 20 minutes. This operation appeared to squeeze the entrapped water, containing the dissolved sodium chloride, from the polymer crumb. After milling, the sodium chloride content of the polymer had dropped from 3.15 weight percent to 0.146 weight percent on the sodium analysis.

The mechanical removal of salt and water from the crumb can be repeated by bringing the pressed crumb into contact with additional hot water if it is found that the level of alkali metal halide contaminant remaining is unacceptably high. In general, the level is reduced to below about 1% by weight by a single physical pressing.

The treatment is applicable to crumb exhibiting a wide range of compositions in which the substituents on the phosphorus atoms of the derivatized polyphosphazene are aryloxy, alkoxy, both substituted and unsubstituted and may include some groups with unsaturation to provide cure sites and described in any of the following recently issued United States Patents;

| Inventor | U.S. Pat. No. | Issued |
|---|---|---|
| Allcock et al | 3,370,020 | February 20, 1968 |
| Rose | 3,515,688 | June 2, 1970 |
| Reynard et al | 3,700,629 | October 24, 1972 |
| Rose et al | 3,702,833 | November 14, 1972 |
| Reynard et al | 3,853,794 | December 10, 1974 |
| Reynard et al | 3,856,712 | December 24, 1974 |
| Rose et al | 3,856,713 | December 24, 1974 |
| Reynard et al | 3,883,451 | May 13, 1975 |
| Cheng et al | 3,972,841 | August 3, 1976 |

In the preceding examples, the polyphosphazene utilized in the formulation was one in which the substituted groups were trifluoroethoxy (—OCH$_2$CF$_3$) and telomerfluoroalkoxy [—OCH$_2$(CF$_2$)—CF$_2$H] as described in Rose U.S. Pat. No. 3,515,688, the ratio between the two being about 70/30 on a mol % basis. The polymer contained phosphazenes with n from 10 to 50,000 the molecular weight distribution being similar to that described in Table III of a Paper published in the Journal of Polymer Science Vol. 14 pages 1379-1395 (1976) by D. W. Carlson et al, but it is to be understood that the invention is applicable to a wide variety of polyphosphazene rubbers such as those described in the above noted patents.

Having now described a preferred embodiment of the invention it is not intended that it be limited except as may be required by the appended claims.

I claim:

1. A process for the removal of alkali metal halide from phosphazene rubber crumb resulting from the precipitation from solution of the reaction product formed by reacting a polydihalophosphazene of the formula $(NPHal_2)_n$ in which Hal represents a halogen and n is between about 20 and 50,000, with at least one compound having the formula QOR wherein Q represents an alkali metal and R represents an organic substituent whereby a mixture of QHal and $[NP(OR)_2]_n$ containing 25% by weight or more of said alkali metal halide is produced which method comprises the steps of (1) swelling said crumb by immersing the said crumb in hot water, to dissolve a substantial portion of the alkali metal halide present in said crumb, (2) withdrawing said swollen crumb from said hot water, and (3) squeezing said swollen crumb sufficiently to express a substantial amount of the resulting alkali metal halide solution associated therewith from said crumb and recovering the resulting phosphazene rubber crumb with a greatly diminished alkali halide content.

2. The process of claim 1 wherein the halogen (Hal) is chlorine and the alkali metal (Q) is sodium.

3. The process of claim 1 wherein the crumb is precipitated from a solution in an organic solvent by stripping the solution of solvent by heating said solution to a temperature sufficient to expel said solvent.

4. The process of claim 3 wherein the stripping is by steam injection.

5. The process of claim 6 wherein OR represents a mixture of fluoroalkoxy groups.

* * * * *